(12) United States Patent
Lanter et al.

(10) Patent No.: US 8,481,876 B2
(45) Date of Patent: Jul. 9, 2013

(54) SWITCH PROTECTION PRIOR TO INSTALLATION IN A BELT LOCK

(75) Inventors: Joshua Lanter, Chur (CH); Clau Lombriser, Trun (CH)

(73) Assignee: Polycontact AG, Chur (CH)

( * ) Notice: Subject to any disclaimer, the term of this patent is extended or adjusted under 35 U.S.C. 154(b) by 368 days.

(21) Appl. No.: 12/942,417

(22) Filed: Nov. 9, 2010

(65) Prior Publication Data

US 2011/0114459 A1    May 19, 2011

(30) Foreign Application Priority Data

Nov. 19, 2009  (CH) .................................... 01786/09

(51) Int. Cl.
- *A44B 11/25* (2006.01)
- *B60R 22/48* (2006.01)
- *H01H 3/16* (2006.01)

(52) U.S. Cl.
USPC .................................................. 200/61.58 B

(58) Field of Classification Search
USPC .................................................. 200/61.58 B
See application file for complete search history.

(56) References Cited

U.S. PATENT DOCUMENTS

| | | | | | |
|---|---|---|---|---|---|
| 3,388,227 | A | * | 6/1968 | Basso et al. | 200/296 |
| 4,196,499 | A | * | 4/1980 | Tolfsen | 24/641 |
| 4,197,945 | A | * | 4/1980 | Sherwood | 206/706 |
| 5,756,937 | A | * | 5/1998 | Gleadall | 174/138 F |

FOREIGN PATENT DOCUMENTS

| | | |
|---|---|---|
| CH | 164409 A | 9/1933 |
| EP | 0 060 254 B1 | 12/1985 |
| EP | 1 025 774 B1 | 7/2004 |
| EP | 1 585 276 A1 | 10/2005 |

* cited by examiner

*Primary Examiner* — Vanessa Girardi

(74) *Attorney, Agent, or Firm* — Buchanan Ingersoll & Rooney PC

(57) ABSTRACT

Switch assembly, including a fixed contact part, an elastic switching contact part, a mounting plate, wherein the fixed contact part and the switching contact part are located on the mounting plate, the switching contact part having at least one extension that projects beyond an outside surface of the mounting plate upon installation and in an operating position such that when the switching contact part is exposed to pressure in a direction of the mounting plate, an electrical signal between the elastic switching contact part and the fixed contact part will be either interrupted or established. A fixing mechanism pretensions the switching contact part prior to installation such that the at least one extension does not project beyond the outside surface of the mounting plate. The fixing mechanism releases the switching contact part tension when the switch assembly is installed and in the operating position.

20 Claims, 5 Drawing Sheets

SWITCH PROTECTION PRIOR TO INSTALLATION IN A BELT LOCK

RELATED APPLICATION

This application claims priority under 35 U.S.C. §119 to Swiss Patent Application No. 01786/09 filed in Switzerland on Nov. 19, 2009, the entire content of which is hereby incorporated by reference in its entirety.

FIELD

The disclosure relates to a switch arrangement, for example, for installation in a belt lock, with a movable contact part that in a mounted state can project into an adjustment path of an adjustable component of the belt lock.

BACKGROUND INFORMATION

Belt locks of restraining systems, for example, seat belt systems, which can be used in, for example, motor vehicles, are often equipped with status sensors with which proper locking of a tongue of the seat belt inserted in the belt lock can be checked. Knowledge of the locking status of the belt lock is useful to notify the passengers by a signal to put on and fasten their seat belts. Since the introduction of safety airbags, information about the locking status of seat belt systems has also been useful for activating or deactivating mechanisms for inflating driver and passenger airbags or side and head airbags.

In addition to contactless status sensors, for example, Hall sensors, electromechanical systems can also be used to monitor one or more components of the belt lock that change their position—for example, two different end positions—when the locking mechanism is actuated. EP-B-1 585 276 discloses a belt lock in which the locking status can be checked by a mechanically actuatable switch. The switch includes a fixed contact sheet and a contact sheet that is designed as a spring contact and that projects into an axial displacement path of a slide that can be moved between two end positions. In the case of locking, the slide presses against a middle bent region of the spring contact, by which a hammer-shaped contact end comes into contact with the fixed contact sheet. The mechanical switch is housed in a separate chamber of a belt lock housing that is closed to the outside. The movable spring contact projects through an opening of the chamber into the axial displacement path of the switch. Mounting of this switch arrangement in the separate chamber of the belt lock housing is relatively cumbersome and can hardly be automated. In mounting by hand, great care should be taken that the movable spring contract is not bent or crimped.

In Swiss Patent Application No. CH 01644/09, a switch arrangement is disclosed that can be designed as a structural unit that can be mounted as a whole on the top or bottom of a frame of the belt lock. The switch arrangement includes a fixed contact part and an elastic switching contact part that can be designed, for example, as contact sheets. Extensions stretch from the legs of a U-shaped free end section of the switching contact part and project through recesses in the top or bottom part of the frame into a displacement path of a belt lock ejector. When the ejector moves axially out of its first end position in the unlocked state into a second end position in a locked state of the belt lock, it crosses the extensions of the switching contact that project into its displacement path. In this way, the switching contact sheet is exposed to pressure and the otherwise interacting contacts on the fixed contact sheet or on the switching contact sheet of the switch arrangement designed as a normally closed (N/C) contact can be separated. The extensions projecting from the switching contact sheet run substantially perpendicular to its lengthwise extension and project beyond the switch receiver. This engenders the danger that during transport or mounting, they will interlock with other components and can thus be deformed and bent.

SUMMARY

A switch arrangement is disclosed, including a fixed contact part, an elastic switching contact part, a mounting plate wherein the fixed contact part and the switching contact part are located on the mounting plate, the elastic switching contact part having at least one extension that projects over an outside surface of the mounting plate in an operating position such that when the elastic switching contact part is exposed to pressure in a direction of the mounting plate, an electrically conductive contact between the elastic switching contact part and the fixed contact part will be interrupted or established, and fixing means via which the elastic switching contact part is pretensioned such that the at least one extension does not project over the outside surface of the mounting plate, the fixing means being detachable when the switch arrangement is mounted to release the switching contact part to an operating position.

A belt lock of a seat belt system is disclosed, including a fixed contact part, an elastic switching contact part, a mounting plate wherein the fixed contact part and the switching contact part are located on the mounting plate, the switching contact part having at least one extension that projects over an outside surface of the mounting plate in an operating position such that when the switching contact part is exposed to pressure in a direction of the mounting plate, an electrically conductive contact between the switching contact part and the fixed contact part will be interrupted or established, and fixing means via which the switching contact part is pretensioned such that the at least one extension does not project over the outside surface of the mounting plate, the fixing means being detachable when the switch arrangement is mounted to release the switching contact part to an operating position.

BRIEF DESCRIPTION OF THE DRAWINGS

Advantages and features of the disclosure will become apparent from the following description of schematic representations of embodiments of the device according to the disclosure.

DETAILED DESCRIPTION

Figure 1:
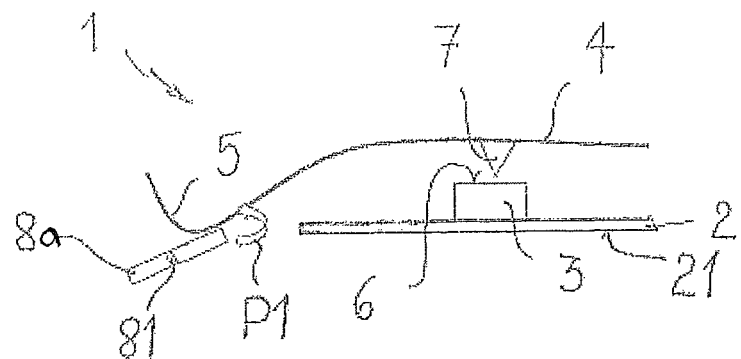
FIG. 1 shows a schematic representation of an exemplary embodiment of switch arrangement according to the disclosure with a switching contact part that is pretensioned by fixing means.

An exemplary switch arrangement of the disclosure is a compact unit and can be easily mounted on or in a belt lock. The exemplary switch arrangement can be prepared for automated mounting. Damage to the contact sheets during transport and/or mounting can be avoided.

An exemplary switch arrangement, for example, for installation in a belt lock of a seat belt system, includes a fixed contact part and an elastic switching contact part that can be located on a mounting plate. The switching contact part has at least one extension that projects over an outside surface of the mounting plate in an operating position. When the switching contact part is exposed to pressure in a direction of the mounting plate, an electrically conductive contact between the switching contact part and the fixed contact part can be interrupted or established. Moreover, there are fixing means via which the switching contact part can be pretensioned in such a way that the at least one extension does not project over the outside surface of the mounting plate. These fixing means, however, can be detached when the switch arrangement is being mounted with release of the elastic switching contact part.

An exemplary switch arrangement according to the disclosure can be designed very compact and can be mounted as a structural unit. The fixing means for the switching contact part can ensure that before installation of the switch arrangement, the components that are important for its operation are not damaged. The switching contact part can be fixed in such a way that it does not project over the mounting plate. For this reason, it can avoid being bent. This can also prevent the individual switch arrangements from interlocking with one another in storage or in transport. The fixing means can be designed in such a way that they can be easily detached again when the switch arrangement is being mounted. In this way, prerequisites for extensive automation of the mounting of the switch arrangement, for example on a belt lock of a seat belt system, are provided.

The fixing means can be detached, for example, by hand. For economical mounting that can be automated, the fixing means can be designed in such a way that they can be automatically detached during mounting.

Depending on the variant embodiment of the switch arrangement, the fixing means can include, for example, a slide or a flap, that overlaps at least one extension, with a scored site. The scored site can be designed as, for example, a film hinge. The slide can be actuated in such a way that in a first end position, it can fix the switching contact part and at least one projecting extension and can release it in a second end position and that the at least one extension projects over the outside surface of the mounting plate. The fixing means can also be formed by, for example, a pin, or a locking pin that can be located on the mounting plate in such a way that it keeps the contact part pretensioned, so that the at least one extension does not project over the outside surface of the mounting plate.

In another exemplary embodiment of the switch arrangement according to the disclosure, the fixing means can encompass a protective sleeve that is connected to the mounting plate and that can be moved relative to the latter with the release of the elastic switching contact part. The mounting plate and the movable protective sleeve can form a largely closed housing for the interacting contacts that are designed as, for example, contact sheets. Within the housing, the contacts are protected against mechanical damage and short circuits.

To facilitate relative movement, the mounting plate can be provided with a slide guide for the protective sleeve in one exemplary embodiment of the disclosure.

For example, for automatic release of the otherwise fixed switching contact part during mounting, one exemplary embodiment of the switch arrangement has proven useful in which on the mounting plate, there is a stop that, in interaction with a corresponding recess on the protective sleeve, allows displacement of the protective sleeve out of a fixed position into a release position and vice versa. The stop can be, for example, a locking cam that projects from the mounting plate and that engages a slot guide in the protective sleeve. The slot guide can be designed in such a way that to move the protective sleeve, a resistance must be overcome, and the protective sleeve can be fixed in the respective displacement position (switching contact part locked or released).

In another exemplary embodiment of the switch arrangement, the switching contact part can be designed as a clip-shaped spring sheet with two axially running side braces. An extension that projects laterally over the mounting plate extends from each of the two side braces. This design of the switching contact part can ensure more uniform actuation. The fixing means locks both extensions. The free ends of the extensions project beyond the outside surface of the mounting plate only in a released state. To facilitate the application of pressure to the switching contact part, the free ends of the extensions can be designed to be skid-shaped.

For mechanical simplification of the switch arrangement in another exemplary embodiment of the disclosure, the latter can be designed as an N/C contact. The contacts of the fixed contact part and of the switching contact part that normally lie on one another can be opened when pressure is applied to the switching contact part.

The exemplary switch arrangement can be designed in such a way that its mounting plate can be mounted on a frame structure of a locking mechanism of a belt lock of a seat belt system, in such a way that the extension or extensions of the elastic switching contact part project into the displacement path of a component that can be moved out of a first end position into a second end position when the locking mechanism is actuated, and can be exposed to pressure from this component. The component that can be moved between the two end positions is, for example, the ejector of the locking mechanism. The switch arrangement with respect to its dimensions is designed in such a way that it is compatible with the belt locks of seat belt systems of motor vehicles on the market and can be arranged within existing housing shells.

The exemplary switch arrangement according to the disclosure can be used, for example, in a belt lock of a seat belt system to generate an optical and/or acoustic warning signal for the passengers, for example of an automobile, to fasten their seat belts. Furthermore, the exemplary switch arrangement according to the disclosure can also be used in a belt lock of a seat belt system for the activation or deactivation of mechanisms for inflating airbags for the passengers of an automobile. For one of ordinary skill in the art, a host of further possible applications that would exceed the scope of this application if enumerated will also be appreciated by this disclosure.

A first exemplary embodiment of the switch arrangement shown schematically in FIG. 1 is labeled with reference number 1 overall. It has a mounting plate 2 on which a fixed contact part 3 and an elastic switching contact part 4 are attached in a manner that is not presented in detail. For example, the switching contact part 4 includes of a spring steel sheet. On its free end, the switching contact part 4 has an extension 5 that in the mounted state interacts with a movable component and is especially exposed to pressure from it. The switch arrangement 1 can be designed as a so-called NIC contact (e.g., when the extension 5 is exposed to pressure, the switching contact part 4 is lifted and the contact regions labeled 6 and 7 are separated). In this way, the circuit can be interrupted. FIG. 1 shows a fixing mechanism that interacts with the extension 5 in such a way that it does not project over an outside surface 21 of the mounting plate 2. For example, the fixing mechanism can be designed as a flap 8a that, as indicated by the arrow P1, snaps over the extension 5 and locks it and holds it pretensioned. The fixing mechanism performs the function of mounting protection and can prevent the switching contact part 4 from being damaged, especially bent.

Figure 3:
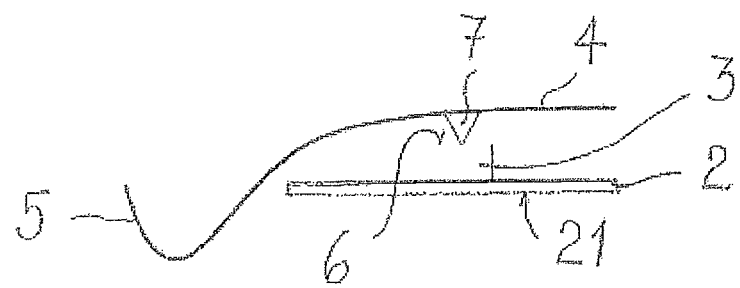
FIG. 3 shows the schematic representation of an exemplary embodiment of the switch arrangement with the switching contact part released.

For unlocking and for releasing the extension 5 and the switching contact part 4, the flap 8a can be, for example, separated at the scored site or at a film hinge 81. In this way, the pretensioning of the switching contact part 4 can be eliminated and the extension 5 on its free end projects beyond the outside surface 21 of the mounting plate 2, as is shown in FIG. 3. In doing so, the contact regions 6 and 7 on the fixed contact part 3 and the switching contact part 4 can come into contact with one another. If the extension 5 is now exposed to pressure in the direction of the mounting plate 2, the switching contact part 4 can be raised. In this way, the contact regions 6, 7 can be separated from one another.

Figure 2:
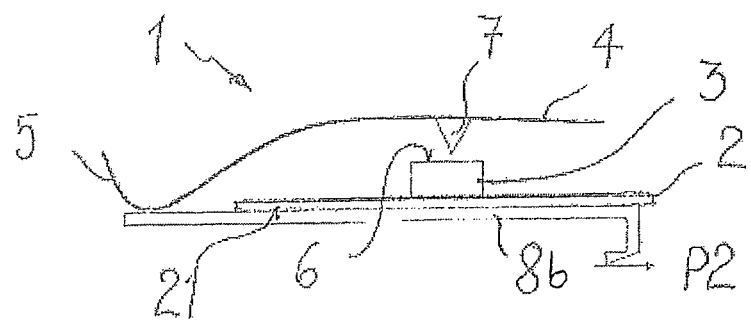
FIG. 2 shows a schematic representation of an exemplary embodiment of the switch arrangement with fixing means that are designed differently.

The exemplary embodiment of the switch arrangement that is shown schematically in FIG. 2 is in turn provided with reference number 1 overall. The fixed contact part, for example a contact sheet, is labeled 3 and has a contact region 6. The elastic switching contact part 4, for example a spring steel sheet, with its extension 5, has a contact region 7. The fixed contact part 3 and the switching contact part are in turn fastened on a mounting plate 2 in a manner that is not presented in detail. As is apparent from the representations, the switch arrangement 1 has a fixing mechanism that is in turn provided with reference number 8b and that can be designed as a slide. In the illustrated inserted state, the slide 8b can prevent the extension 5 of the switching contact part 4 from projecting beyond the outside surface 21 of the mounting plate 2, and it can hold the switching contact part 4 in a pretensioned manner.

To detach the attachment of the extension 5 and to eliminate the pretensioning of the switching contact part 4, the slide 8b can be pushed according to arrow P2. In this way, the switching contact part 4 can be released, and the extension 5 projects beyond the outside surface 21 of the mounting plate 2, as is apparent in turn from FIG. 3. Here, the contact regions 6 and 7 on the fixed contact part 3 and on the switching contact part 4 come into contact with one another. If the extension 5 is now exposed to pressure in the direction of the mounting plate 2, the switching contact part 4 can be lifted. In this way, the contact regions 6, 7 can be separated from one another.

Figure 4:
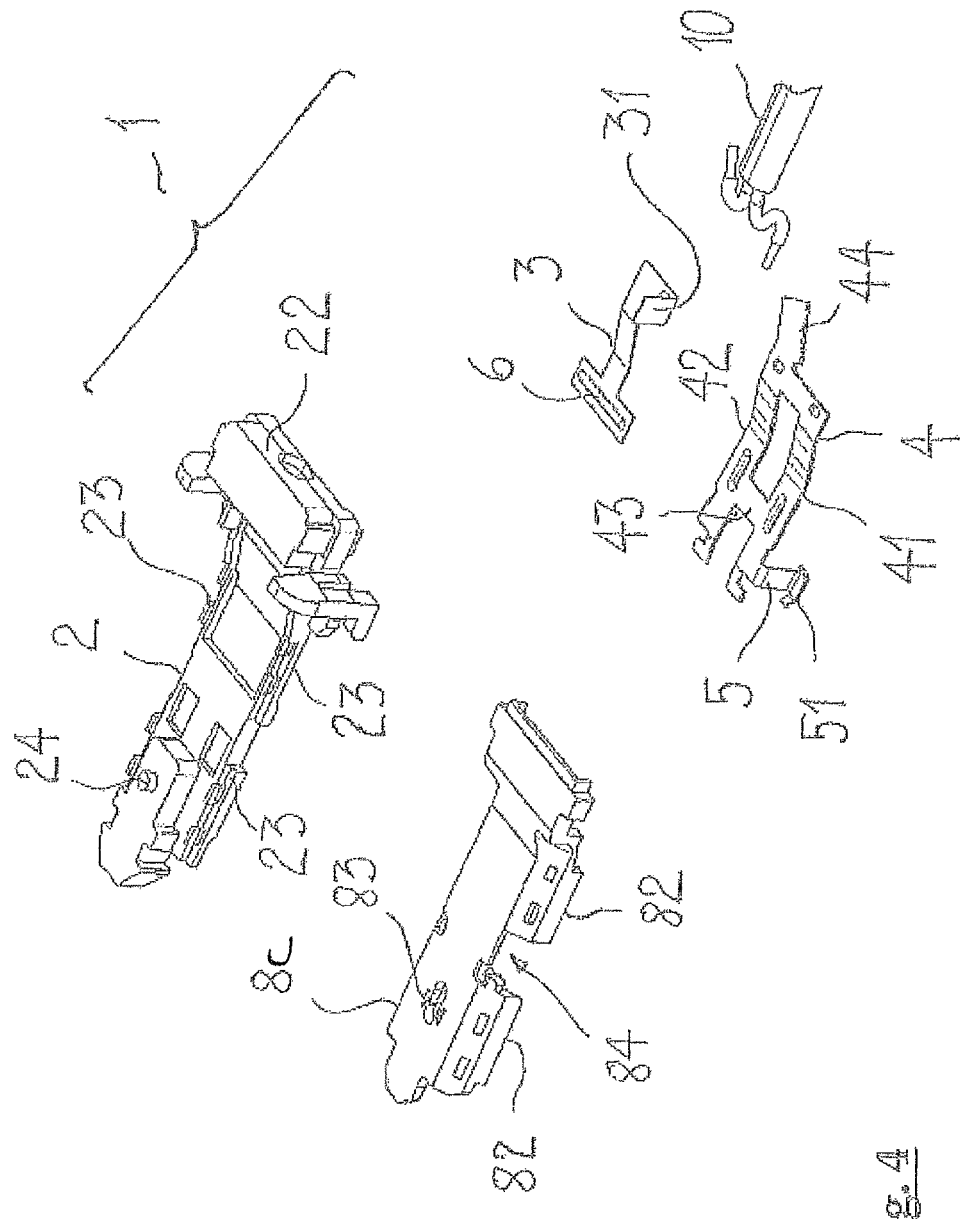
FIG. 4 shows an exploded diagram of an exemplary second embodiment of the switch arrangement.

The exploded drawing in FIG. 4 shows another exemplary embodiment of the switch arrangement that is designed according to the disclosure and that is in turn provided with reference number 1 overall. The switch arrangement 1 includes a mounting plate 2 on which a fixed contact part 3 and an elastic switching contact part 4 can be fastened. The fixed contact part 3 has the shape of a hammer and a contact region 6 that is facing the viewer in the representation. The switching contact part 4 can be designed to be clip-like and can include two side braces 41, 42 that can be connected to one another via a transverse brace 43. In the region of the transverse brace 43, on the side braces 41, 42, contact regions 7 can be designed in each case that point away from the viewer in the representation. In the vicinity of the transverse brace 43, extensions 5 whose free ends 51 can be designed to be skid-like, project from the side braces roughly at a right angle. The extensions 5 stretch from the outer sides of the side braces 41, 42 in the direction of the bottom of the switching contact part 4. This can facilitate the production of the switching contact part produced, for example, from a spring steel sheet in a sheet metal punching and bending process. On its end regions that are facing away from the contact regions 6, 7, the fixed contact part 3 and the switching contact part 4 are in each case equipped with connecting regions 31, 44 for wires of a supply line 10. On the mounting plate 2, there is a tension relief device 22 that is provided with a penetrating opening for the supply line 10.

The exemplary switch arrangement 1 can be equipped with fixing mechanism 8 that can be designed as a protective sleeve in the illustrated embodiment. The protective sleeve 8c can be seated on the mounting plate 2 and can be moved relative to the latter in the longitudinal direction. For this purpose, the mounting plate 2 on its longitudinal sides can be equipped with a slide guide 23 that interacts with the correspondingly designed guides 82 on the protective sleeve 8c. To limit the longitudinal displacement of the protective sleeve 8c relative to the mounting plate 2, a locking cam 24 projects from the mounting plate 2 and engages a slot-shaped recess 83 in the protective sleeve 8c in the mounted state. The slot-shaped recess 83 can be designed constricted in such a way that in the relative displacement between the mounting plate 2 and the protective sleeve 8c out of a first end position into the second end position, a resistance must be overcome. This can ensure that unintentional displacement cannot occur. The protective sleeve 8c is provided on its longitudinal edges with recesses 84 that are opposite one another. In the mounted state, the extensions 5 of the switching contact part 4 project through these recesses 84.

Figure 5:
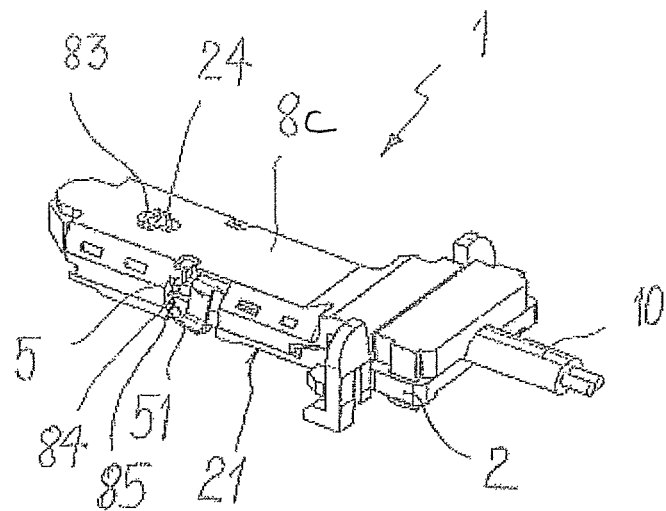
FIG. 5 shows a perspective representation of the assembled switch arrangement according to FIG. 4.

FIG. 5 shows the switch arrangement 1 in the assembled state. The protective sleeve 8c can be seated on the mounting plate 2. The locking cam 24 that projects from the mounting plate 2 engages in the slot-shaped recess 83 of the protective sleeve 8c. Reference number 10 refers to the supply cable that projects out of the switch arrangement 1. The representation shows the switch arrangement 1 with a pretensioned or fixed switching contact part in which the free ends 51 of the extensions 5 designed to be skid-shaped do not project over the outside surface 21 of the mounting plate 2. For this purpose, the skid-shaped free ends 51 of the extensions 5 adjoin the end flank 85 of the protective sleeve 8c that borders the lateral recess 84 on one side. FIG. 5 shows only one extension 5. Conditions on the opposite side of the switch arrangement that are not visible to the viewer can be analogous.

Figure 6:
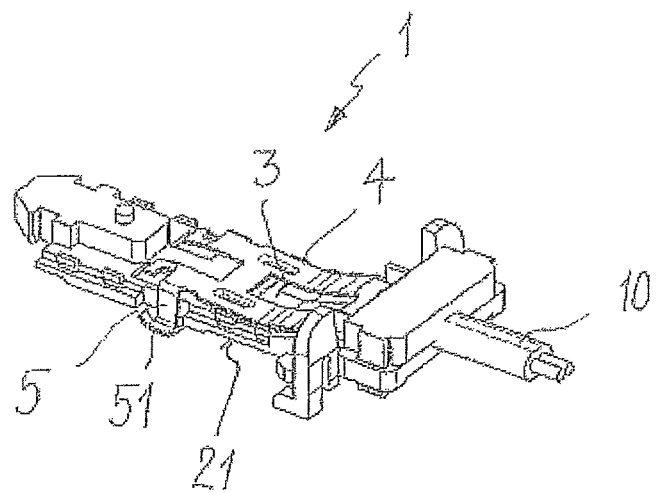
FIG. 6 shows a perspective representation according to FIG. 5 without a movable protective sleeve.

FIG. 6 is a representation analogous to FIG. 5, the protective sleeve 5 (FIG. 5) being removed. The switching contact part 4 is shown in the pretensioned state, in which the projecting extension 5 with its skid-shaped free end 51 does not project over the outside surface 21 of the mounting plate 2. The fixed contact part located underneath the switching contact part 4 is labeled 3.

Figure 7:
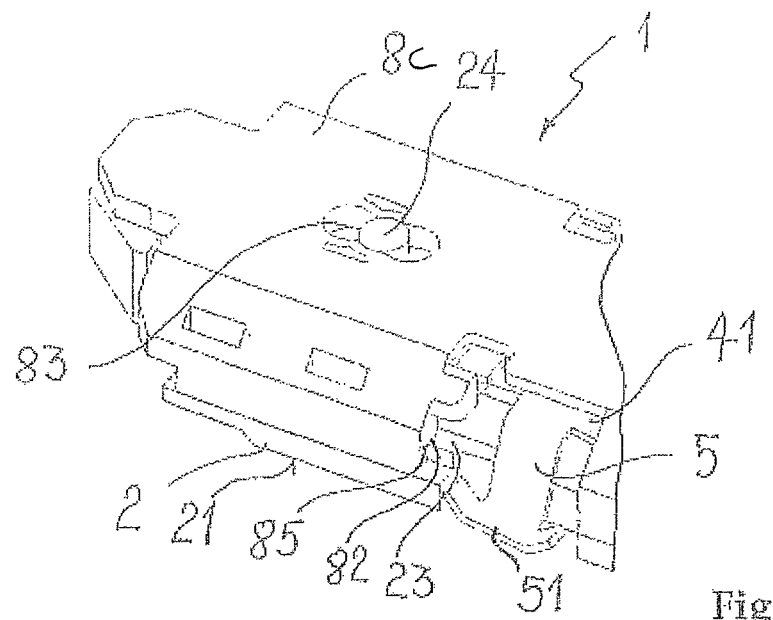
FIG. 7 shows an enlargement of the assembled switch arrangement according to FIG. 5.

The enlarged extract of the switch arrangement 1 in FIG. 7 shows the protective sleeve 8c in an intermediate position, shortly before reaching one of the end positions. The locking cam 24 that projects from the mounting plate 2 can be located in the constricted passage of the slot-shaped recess 83. The extension 5 projecting from the side brace 41 of the switching contact part with its skid-shaped free end 51 is still shown in the fixed state and can move downward due to the expansion of the switching contact part (into the plane of the drawing) and can project over the outside surface 21 of the mounting plate 2. The end flank, which borders the lateral recess 84 and on which in the pretensioned state the skid-shaped free end 51 of the extension is supported, is in turn provided with the reference number 85. It is also shown in the representation how the slide guide 23 on the mounting plate 2 and the lateral guides 82 corresponding to it interact on the protective sleeve 8c.

Figure 8:
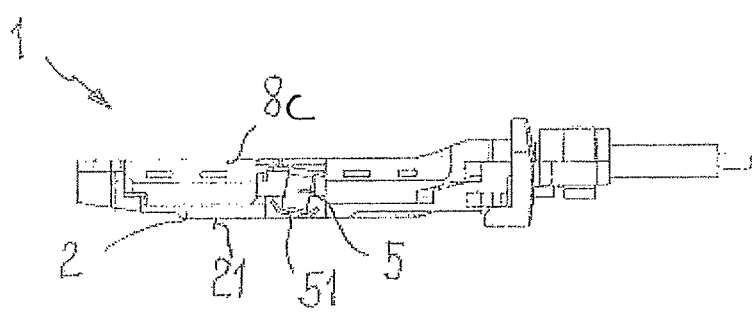
FIG. 8 shows a schematic side view of the assembled switch arrangement according to FIG. 5 with the switching contact part locked.
Figure 9:
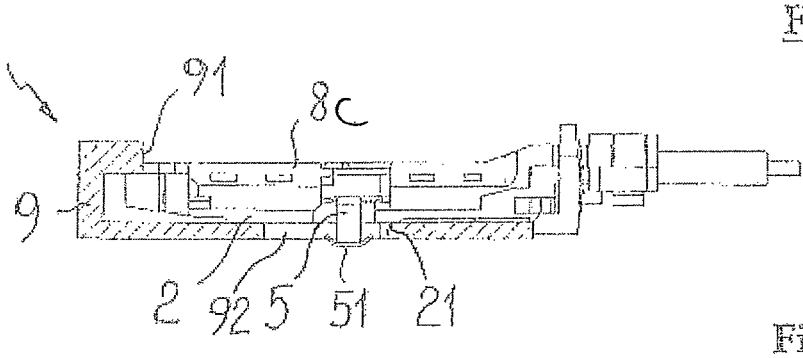
FIG. 9 shows a schematic side view of the switch arrangement according to FIG. 8 with the switching contact part released.

FIGS. 8 and 9 show side views of the exemplary switch arrangement 1 according to FIG. 5. In this case, FIG. 8 shows the exemplary switch arrangement 1 in the storage and delivery state in which the switching contact part is pretensioned by the sleeve 8c in such a way that the extension 5 does not project over the outside surface 21 of the mounting plate 2. FIG. 9 shows the exemplary switch arrangement 1 in the mounted state on a component 9, which is provided with an opening 11. During mounting, the protective sleeve 8c can be moved relative to the mounting plate 2. In this way, the switching contact part can be released, and the extension 5 stretches beyond the outside surface 21 of the mounting plate 2 and projects through the opening 92 of the component 9. There, the skid-shaped free end 51 of the extension can be exposed to pressure from a component that slides along it in order to actuate the switch arrangement 1. The protective sleeve 8c can automatically move, for example, during mounting when the protective sleeve 8c strikes a stop 91 of the component 9 when the switch arrangement 1 is being positioned.

Figure 10:
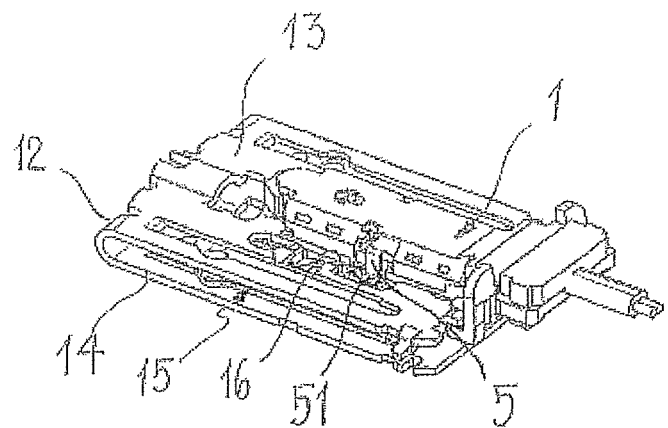
FIG. 10 shows an exemplary embodiment of a switch arrangement mounted on a frame of a locking mechanism of a belt lock of a seat belt system.
Figure 11:
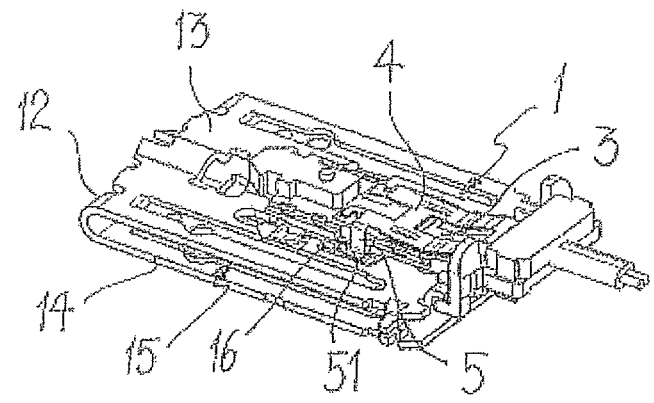
FIG. 11 shows the switch arrangement from FIG. 10 mounted on the frame without a movable protective sleeve.

FIGS. 10 and 11 show one application of exemplary switch arrangement according to the disclosure for display of the locking status in a belt lock of a seat belt system. With the exception of the protective sleeve that is not shown in FIG. 11, FIGS. 10 and 11 are identical. FIGS. 10 and 11 show only the frame structure of a locking mechanism, as it is known from, for example, EP-1 025 774, which in this respect is hereby incorporated by reference. The known metallic frame structure, in and on which the locking mechanism of the belt lock is housed, bears the reference number 12 overall. It includes a flat top part 13 and a related flat bottom part 14 that can be securely connected to one another by, for example, riveting. The top part 13 and the bottom part 14 border a gap-shaped guide channel 15 into which a belt tongue, that is not shown, can be axially inserted. In the representation of FIGS. 10 and 11, this can take place, for example, from the left. Here, an electrically nonconductive component that is located in the guide channel 15, for example an ejector, is moved axially against the reset force of a spring (not shown). In the top part 13, there are openings 16 by which the skid-shaped free ends 51 of the extensions 5 of the switching contact part 4, which ends project after their release from the mounting plate of the switch arrangement 1, project into the guide channel 15 and the displacement path of the ejector. The extensions 5 can be fixed for transport and storage and can be automatically released during mounting so that they project into the displacement path of the ejector. In the axial displacement of the ejector out of the first end position in the unlocked state into a second end position in the locked state of the belt lock, it crosses the skid-shaped free ends 51 of the extensions 5. In this way, the switching contact part 4 can be exposed to pressure, and the interacting contacts on the fixed contact part 3 and on the switching contact part 4 of the switch arrangement 1 designed as an N/C contact are separated.

Figure 12:
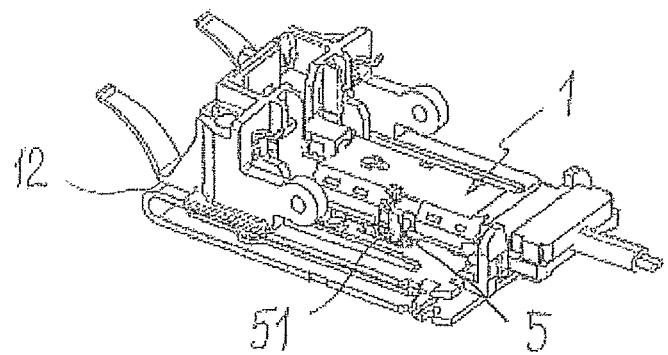
FIG. 12 shows an exemplary embodiment of a locking mechanism of a belt lock with a switch arrangement mounted on a frame.

FIG. 12 shows another application of an exemplary switch arrangement designed according to the disclosure in a belt lock of a seat belt system. In this case, the switch arrangement 1 is in turn mounted on a frame structure 12 of the locking mechanism of the belt lock. The locking mechanism corresponds, for example, to the mechanism that is known from EP-B-0 060 254 and that is incorporated by reference. Also, in this locking mechanism, an ejector can be moved against the reset force of a spring within the frame structure. In doing so, it crosses the skid-shaped free ends 51 of the extensions 5 of the switching contact part that project through openings into the displacement path of the ejector. In this way, the switching contact part is exposed to pressure, and the interacting contacts on the fixed contact part or on the switching contact part of the switch arrangement 1 designed as an N/C contact can be separated.

The information obtained by the integrated switch arrangement about the locking status of the belt lock can be used, for example, for a belt warning indicator by an optical and/or acoustic warning signal being produced depending on the detected locking status of the seat belt system, which means to the passenger or passengers of the automobile to fasten their seat belts. Furthermore, the belt lock that is equipped according to the disclosure can also be used for activation or deactivation of mechanisms for inflating airbags for the passengers of an automobile. If there is no passenger in the vehicle, the airbags on the passenger side can be deactivated, for example, based on the detected locking status (unlocked).

The switch arrangement designed according to the disclosure is drawn up as a structural unit and can be easily handled and mounted. The actuators (extensions) of the switching contact part that can be exposed to pressure can be protected during transport and storage of the switch arrangement. One exemplary embodiment of the disclosure calls for the actuators (extensions) to be released automatically during mounting so that the switch arrangement can perform its function.

It will be appreciated by those having ordinary skill in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:
1. Switch assembly, comprising:
a fixed contact part;
an elastic switching contact part;
a mounting plate, wherein the fixed contact part and the switching contact part are located on the mounting plate, the switching contact part having at least one extension that projects beyond an outside surface of the mounting plate upon installation and in an operating position such that when the switching contact part is exposed to pressure in a direction of the mounting plate, an electrical signal between the elastic switching contact part and the fixed contact part will be either interrupted or established; and a fixing mechanism which pretensions the switching contact part prior to installation such that the at least one extension does not project beyond the outside surface of the mounting plate, the fixing mechanism releases the switching contact part tension when the switch assembly is installed and in the operating position.

2. Switch assembly according to claim 1, wherein a free end of the at least one extension is skid-like.

3. Switch assembly according to claim 1, wherein the switch is normally closed N/C contact.

4. Switch assembly according to claim 1, wherein the mounting plate is installed on a frame structure in a belt locking mechanism within a seat belt system; wherein the at least one extension, of the switching contact part, projects into a displacement path of a component that moves from a first end position into a second end position when the belt locking mechanism is actuated.

5. Switch assembly according to claim 1, comprising:
an arrangement for generating an optical and/or acoustic warning signal.

6. Switch assembly according to claim 1, comprising:
an arrangement for activation or deactivation of mechanisms for inflating airbags for passengers of an automobile.

7. Switch assembly according to claim 1, wherein the fixing mechanism comprises:
a slide or a flap that overlaps the at least one extension, wherein the flap is delineated by a scored site, or a pin or locking pin.

8. Switch assembly according to claim 7, wherein the fixing mechanism comprises:
a protective sleeve encompassing a portion of the mounting plate, which moves relative to the mounting plate and facilitates release of the switching contact part.

9. Switch assembly according to claim 1, wherein the fixing mechanism automatically releases the switching contact part tension during installation.

10. Switch assembly according to claim 9, wherein the fixing mechanism comprises:
a slide or a flap that overlaps the at least one extension, wherein the flap is delineated by a scored site, or a pin or locking pin.

11. Switch assembly according to claim 9, wherein the fixing mechanism comprises:
a protective sleeve encompassing a portion of the mounting plate, which moves relative to the mounting plate and facilitates release of the switching contact part.

12. Switch assembly according to claim 1, wherein the fixing mechanism comprises:
a protective sleeve encompassing a portion of the mounting plate, which moves relative to the mounting plate and facilitates release of the switching contact part.

13. Switch assembly according to claim 12, wherein the switching contact part comprises:
a clip-shaped spring sheet with two side braces; where
a second extension extends from a side brace and has a free end which, in a released state, projects beyond the outside surface of the mounting plate.

14. Switch assembly according to claim 12, wherein the mounting plate further comprises:
a slide guide that facilitates movement of the protective sleeve.

15. Switch assembly according to claim 14, wherein the mounting plate further comprises:
a stop which interacts with a corresponding recess on the protective sleeve to allow movement of the protective sleeve relative to the mounting plate.

16. Switch assembly according to claim 14, wherein the switching contact part comprises:
a clip-shaped spring sheet with two side braces; where
a second extension extends from a side brace and has a free end which, in a released state, projects beyond the outside surface of the mounting plate.

17. Switch assembly according to claim 12, wherein the mounting plate further comprises:
a stop which interacts with a corresponding recess on the protective sleeve to allow movement of the protective sleeve relative to the mounting plate.

18. Switch assembly according to claim 17, wherein the stop is a locking cam that projects out of the mounting plate and engages a slot guide in the protective sleeve.

19. Switch assembly according to claim 17, wherein the switching contact part comprises:
a clip-shaped spring sheet with two side braces; where
a second extension extends from a side brace and its free end, in a released state, projects beyond the outside surface of the mounting plate.

20. A belt lock within a seat belt system, comprising:
a switch assembly which comprises:
a fixed contact part;
an elastic switching contact part;
a mounting plate, wherein the fixed contact part and the switching contact part are located on the mounting plate, the switching contact part having at least one extension that projects beyond an outside surface of the mounting plate in an operating position such that when the switching contact part is exposed to pressure in a direction of the mounting plate, an signal between the switching contact part and the fixed contact part will be either interrupted or established; and
a fixing mechanism which pretensions the switching contact part prior to installation such that the at least one extension does not project beyond the outside surface of the mounting plate, the fixing releases the switching contact part tension when the switch assembly is installed and in the operating position.

* * * * *